(12) United States Patent
Sakaguchi et al.

(10) Patent No.: US 10,231,374 B2
(45) Date of Patent: Mar. 19, 2019

(54) TRAVEL SUPPORT SYSTEM, TRAVEL SUPPORT METHOD, AND WORK VEHICLE

(71) Applicant: Kubota Corporation, Osaka-shi (JP)

(72) Inventors: Kazuo Sakaguchi, Amagasaki (JP); Yasuhisa Uoya, Amagasaki (JP); Takafumi Morishita, Amagasaki (JP); Kotaro Yamaguchi, Amagasaki (JP); Hiroki Suga, Amagasaki (JP); Megumi Suzukawa, Amagasaki (JP)

(73) Assignee: KUBOTA CORPORATION, Osaka-Shi (JP)

( * ) Notice: Subject to any disclaimer, the term of this patent is extended or adjusted under 35 U.S.C. 154(b) by 115 days.

(21) Appl. No.: 15/385,769

(22) Filed: Dec. 20, 2016

(65) Prior Publication Data

US 2017/0367252 A1 Dec. 28, 2017

(30) Foreign Application Priority Data

Jun. 23, 2016 (JP) .................................. 2016-124848

(51) Int. Cl.
*A01B 69/04* (2006.01)
*G01S 19/14* (2010.01)

(52) U.S. Cl.
CPC ............ *A01B 69/008* (2013.01); *G01S 19/14* (2013.01)

(58) Field of Classification Search
CPC ... A01B 69/008; G01S 19/14; A01D 41/1278; G05D 1/0214; G05D 1/0278; G05D 1/0274; G05D 1/0287; G05D 1/0016; G05D 1/0022; G05D 1/0038; B60W 30/143

See application file for complete search history.

(56) References Cited

U.S. PATENT DOCUMENTS

| 9,164,513 B2* | 10/2015 | Matsuzaki ........... G05D 1/0287 |
| 2016/0031443 A1* | 2/2016 | Komatsu ............. B60W 30/143 |
| | | 701/93 |
| 2017/0088147 A1* | 3/2017 | Tentinger .............. B60W 50/10 |

(Continued)

FOREIGN PATENT DOCUMENTS

| EP | 3104244 | 12/2016 |
| WO | WO 2015/119266 | 8/2015 |

OTHER PUBLICATIONS

Zhang et al., Development of an intelligent master-slave system between agricultural vehicles, IEEE, 2010, 250-255 (Year: 2010).*

(Continued)

*Primary Examiner* — McDieunel Marc
(74) *Attorney, Agent, or Firm* — Mori & Ward, LLP

(57) ABSTRACT

A travel support system for a work vehicle including a vehicle body and a work device provided on the vehicle body includes a first calculator to calculate a vehicle body occupied area including the vehicle body in a plan view. A second calculator is to calculate a work device occupied area including the work device in the plan view. A third calculator is to calculate a work vehicle occupied area including the work vehicle in the plan view, the work vehicle occupied area including the vehicle body occupied area and the work device occupied area. A position calculator is to calculate a position of the work vehicle in a work field based on positioning data. A controller is to control the work vehicle to move in the work field based on the position of the work vehicle and the work vehicle occupied area.

10 Claims, 4 Drawing Sheets

(56) References Cited

U.S. PATENT DOCUMENTS

| | | | |
|---|---|---|---|
| 2017/0090741 A1* | 3/2017 | Tentinger | G06F 8/38 |
| 2017/0168501 A1* | 6/2017 | Ogura | G05D 1/0278 |
| 2017/0177002 A1* | 6/2017 | Ogura | A01B 69/008 |
| 2018/0011495 A1* | 1/2018 | Sakaguchi | A01B 69/008 |
| 2018/0024563 A1* | 1/2018 | Matsuzaki | G05D 1/0214 |
| 2018/0113471 A1* | 4/2018 | Sakaguchi | G05D 1/0274 |
| 2018/0136664 A1* | 5/2018 | Tomita | A01D 41/1278 |

OTHER PUBLICATIONS

Wang et al., Autonomous maneuvers of a robotic tractor for farming, IEEE, 2016, p. 592-597 (Year: 2016).*

* cited by examiner

TRAVEL SUPPORT SYSTEM, TRAVEL SUPPORT METHOD, AND WORK VEHICLE

CROSS-REFERENCE TO RELATED APPLICATIONS

The present application claims priority under 35 U.S.C. § 119 to Japanese Patent Application No. 2016-124848, filed Jun. 23, 2016. The contents of this application are incorporated herein by reference in their entirety.

BACKGROUND OF THE INVENTION

Field of the Invention

The present invention relates to a travel support system, a travel support method, and a work vehicle.

Discussion of the Background

A work vehicle includes a vehicle body having a travel mechanism, and a work device mounted on this vehicle body. The work device operates as the vehicle body travels. Examples of such a work vehicle include rice transplanters, combines, and tractors attached with a tilling machine.

To prevent a work vehicle from coming into collision with any obstructions such as fences and ridges defining an external shape of a work field, as well as ponds, structures, stones, and rocks present in the work field, recent work vehicles have a function of avoiding interference with such obstructions, when positions of which are already known, by checking positional relationships between the work vehicle and the obstructions based on an own position calculated using a GPS.

For example, PCT International Publication No. 2015/119266 discloses an autonomously travelling work vehicle equipped with a work device (tilling machine) on a tractor vehicle body. The autonomously travelling work vehicle defines a rectangular area occupied by an overall length of the vehicle body and a width of the work device as a virtual maximum occupied area to be occupied when the travelling work vehicle travels, and stores the area in a memory of a controller. When the autonomously travelling work vehicle travels, the autonomously travelling work vehicle determines whether the maximum occupied area overlaps with an area outside the field. If the maximum occupied area is out of a set range, the autonomously travelling work vehicle is not allowed to travel autonomously, but a driver adjusts a travel direction of the autonomously travelling work vehicle, since, even if the vehicle body positions within the set range in the field, a rear end or a side end of the work device may position outside the field. PCT International Publication No. 2015/119266 also proposes that a shape of a maximum occupied area is not limited to rectangular, but a circumscribed circle of this rectangular may be included so as to easily recognize interference with, for example, a ridge when the work vehicle makes a turn.

SUMMARY OF THE INVENTION

According to one aspect of the present invention, a travel support system for a work vehicle including a vehicle body and a work device provided on the vehicle body includes a first calculator, a second calculator, a third calculator, a position calculator, and a controller. The first calculator is to calculate a vehicle body occupied area including the vehicle body in a plan view. The second calculator is to calculate a work device occupied area including the work device in the plan view. The third calculator is to calculate a work vehicle occupied area including the work vehicle in the plan view, the work vehicle occupied area including the vehicle body occupied area and the work device occupied area. The position calculator is to calculate a position of the work vehicle in a work field based on positioning data. The controller is to control the work vehicle to move in the work field based on the position of the work vehicle and the work vehicle occupied area.

According to another aspect of the present invention, a work vehicle includes a vehicle body, a work device, a first calculator, a second calculator, a third calculator, a position calculator, and a controller. The work device is provided on the vehicle body. The first calculator is to calculate a vehicle body occupied area including the vehicle body in a plan view. The second calculator is to calculate a work device occupied area including the work device in the plan view. The third calculator is to calculate a work vehicle occupied area including the work vehicle in the plan view, the work vehicle occupied area including the vehicle body occupied area and the work device occupied area. The position calculator is to calculate a position of the work vehicle in a work field based on positioning data. The controller is to control the work vehicle to move in the work field based on the position of the work vehicle and the work vehicle occupied area.

According to further aspect of the present invention, a travel support method for a work vehicle includes calculating a vehicle body occupied area including a vehicle body of the work vehicle in a plan view. A work device occupied area including a work device of the work vehicle in the plan view is calculated. A work vehicle occupied area including the work vehicle in the plan view is calculated. The work vehicle occupied area includes the vehicle body occupied area and the work device occupied area. A position of the work vehicle in a work field is calculated based on positioning data. The work vehicle is controlled to move in the work field based on the position of the work vehicle and the work vehicle occupied area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
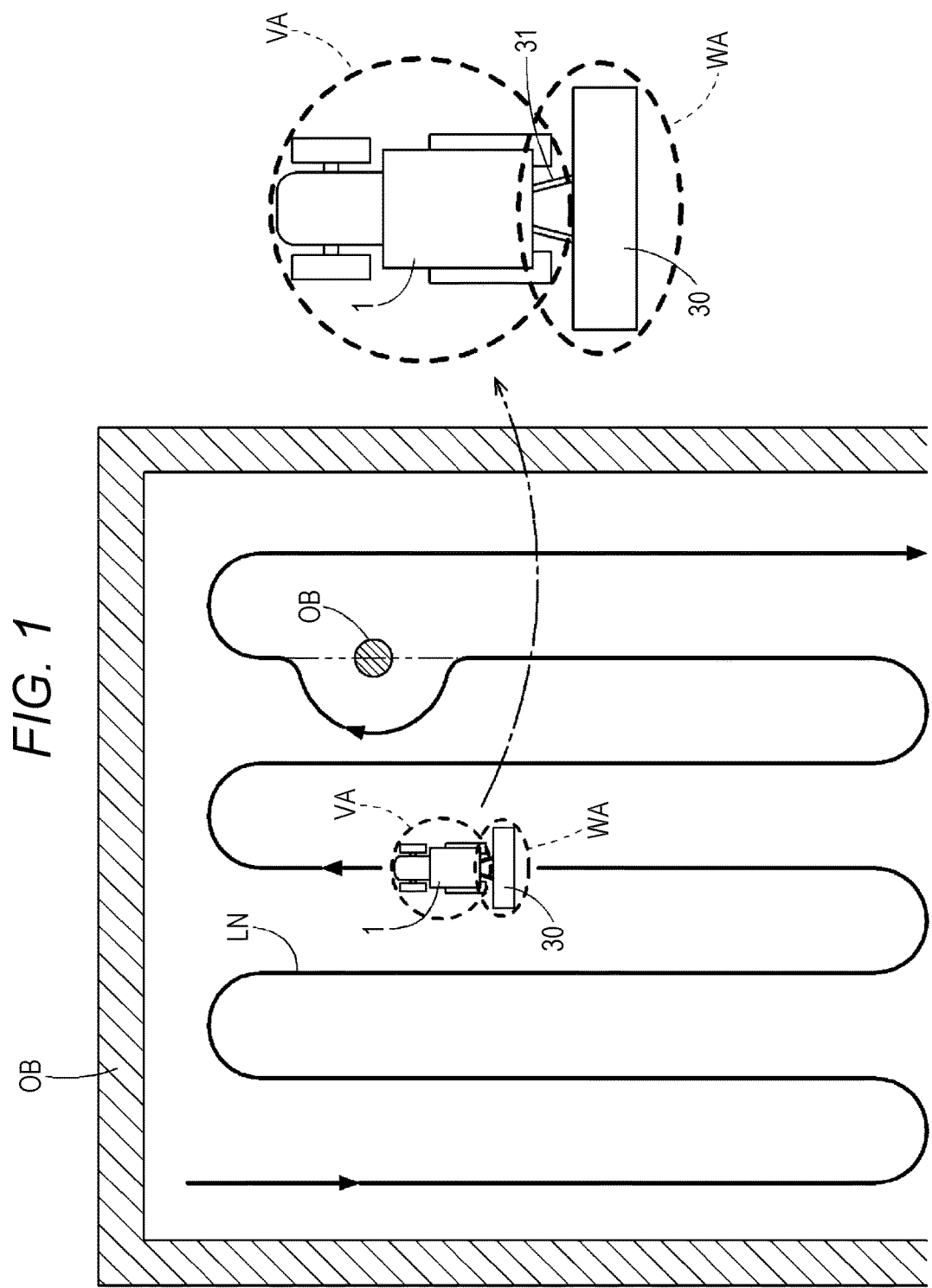
FIG. 1 is an explanatory view illustrating a virtual area to be occupied by a work vehicle, which is managed and separated into a vehicle body occupied area occupied by a vehicle body and a work device occupied area occupied by a work device.

The embodiments will now be described with reference to the accompanying drawings, wherein like reference numerals designate corresponding or identical elements throughout the various drawings.

Prior to describing a travel support system and a work vehicle according to a specific exemplary embodiment of the present invention, basic principles of the travel support system will now be described herein with reference to FIG. 1. The work vehicle herein includes a vehicle body 1 having a travel function and a work device 30 mounted on the vehicle body 1 via a lifting mechanism 31. This work vehicle is further equipped with a satellite positioning module configured with, for example, a GNSS module to output positioning data indicating a coordinate position of the vehicle body (hereinafter simply referred to as an own position). Although an own position represented by the positioning data stems at a position of an antenna as a reference, the own position is corrected so as to represent an appropriate position of the vehicle, instead of the position of the antenna.

In FIG. 1, ridges or fences forming an outer boundary area of a work field and installed objects that may hinder the work vehicle from travelling in the work field are regarded as obstructions, and an area occupied by one of the obstructions present in the work field is illustrated as an obstruction area OB. A travel route LN for guiding the work vehicle to travel in the work field is formed by straight routes extending in parallel each other and 180°-turned routes joining the straight routes. When the work vehicle is manually steered and travelled by a driver, a function of notifying a difference between the travel route LN and an own position acts to support the work vehicle to travel along the travel route LN. When the work vehicle is automatically steered and travelled along the travel route LN, a travel support function acts to control the steering control wheels to correct a difference between the travel route LN and an own position.

In an example shown in FIG. 1, a coordinate position of the obstruction on a map and its size and a ground height are registered beforehand in the control system of the work vehicle, and the obstruction area OB corresponding to the obstruction is also set. To simplify a positional relationship between the obstruction (obstruction area OB) and the work vehicle configured with the vehicle body 1 and the work device 30, in other words, to easily compute a possibility of interference, complicated shapes of the vehicle body 1 and the work device 30 are replaced with simple, virtual shapes, i.e., a vehicle body occupied area VA and a work device occupied area WA. The vehicle body occupied area VA and the work device occupied area WA both indicate sizes when seen in plan view on a ground. With the vehicle body occupied area VA and the work device occupied area WA, a virtual area occupied by the work vehicle when the work vehicle travels in the work field is determined. Positional relationships between the vehicle body occupied areas VA and work device occupied areas WA and the own positions are recorded in a table beforehand so that positions of a vehicle body occupied area VA and a work device occupied area WA in the work field (coordinate positions on the map) are calculated in a real-time manner.

As shown in FIG. 1, the vehicle body occupied area VA is an oval or circle covering an external shape of the vehicle body 1 as seen in plan view. The work device occupied area WA is an oval or circle covering an external shape of the work device 30 as seen in plan view. The vehicle body occupied area VA and the work device occupied area WA may each be a polygon such as rectangular, but is set in size with which the actual vehicle body 1 and the actual work device 30 are each included.

Since interference between an obstruction and the vehicle body 1 is calculated as an overlap between the obstruction area OB and the vehicle body occupied area VA and interference between an obstruction and the work device 30 is calculated as an overlap between the obstruction area OB and the work device occupied area WA, guiding the work vehicle so that such an overlap does not occur can avoid interference between the obstruction and the work vehicle.

The vehicle body occupied area VA and the work device occupied area WA respectively can be desirably set in size. To increase a safety factor for avoiding interference with an obstruction, the vehicle body occupied area VA and the work device occupied area WA may respectively be increased in size. From this view point, since braking precision and steering precision lower when the work vehicle travels at a high speed, relative to braking precision and steering precision when the work vehicle travels at a low speed, for example, the vehicle body occupied area VA and the work device occupied area WA respectively may advantageously be expanded in size when the work vehicle travels at a high speed, relative to sizes of the vehicle body occupied area VA and the work device occupied area WA when the work vehicle travels at a low speed. Areas can also automatically be scaled up or down in accordance with a vehicle speed. The obstruction area OB and the vehicle body occupied area VA can also be scaled up or down in size depending on skills of a driver or a type of a travelling operation.

Figure 2:
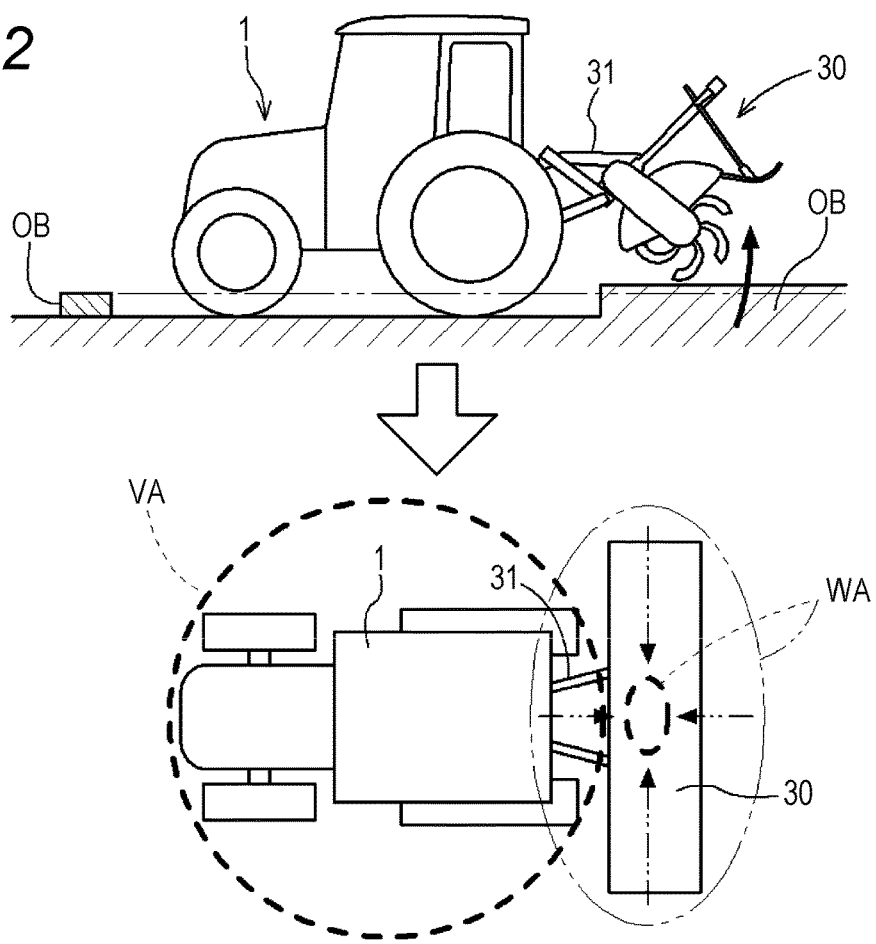
FIG. 2 is an explanatory view illustrating the area occupied by the work device, a size of which is scaled up or down in accordance with a height relationship between the work device and an obstruction.

With this work vehicle as described above, the work device 30 changes in ground height since the work device 30 is mounted on the vehicle body 1 via the lifting mechanism 31. As shown in FIG. 2, when a ground height of the obstruction area OB is below a ground height of the work device 30, the work device occupied area WA may be caused to disappear (or to reduce). Since the vehicle body occupied area VA is kept maintained in size, the vehicle body 1 is supported when travelling so as to avoid interference with the obstruction area OB. When a front of the vehicle body 1, i.e., a bonnet (including a frame), for example, is extended forward from the front wheels, and, as a result, the vehicle body occupied area VA is extended forward from the front wheels, the vehicle body occupied area VA may be reduced relative to this obstruction area OB as long as a ground height of the obstruction area OB is below a ground height of this bonnet. While the vehicle body 1 is prevented from coming into collision with the obstruction area OB, this reduction can as much as possible reduce an area that remains unworked.

In the above described example, the obstruction (obstruction area OB) is already described in the obstruction information of the work field, and its coordinate position on the map is also stored in the memory of the work vehicle. Once an own position is calculated, a vehicle body occupied area VA and a work device occupied area WA are both calculated in accordance with the own position together with map coordinates of nearby obstructions, and then a possibility of interference is calculated based on a distance between the vehicle body occupied area VA and the work device occupied area WA. For an obstruction that is not described in the obstruction information, in particular, a moving obstruction, when the work vehicle is equipped with an obstruction detector using, for example, a monitoring camera, an ultrasonic device, or a laser device, an obstruction area OB is generated in real time based on a result of detection, and then a possibility of interference is calculated based on a distance between the vehicle body occupied area VA and the work device occupied area WA. Another possible method is to place monitoring cameras, ultrasonic devices, and laser devices in a field to send results of detections as obstruction information to the work vehicle.

Figure 3:
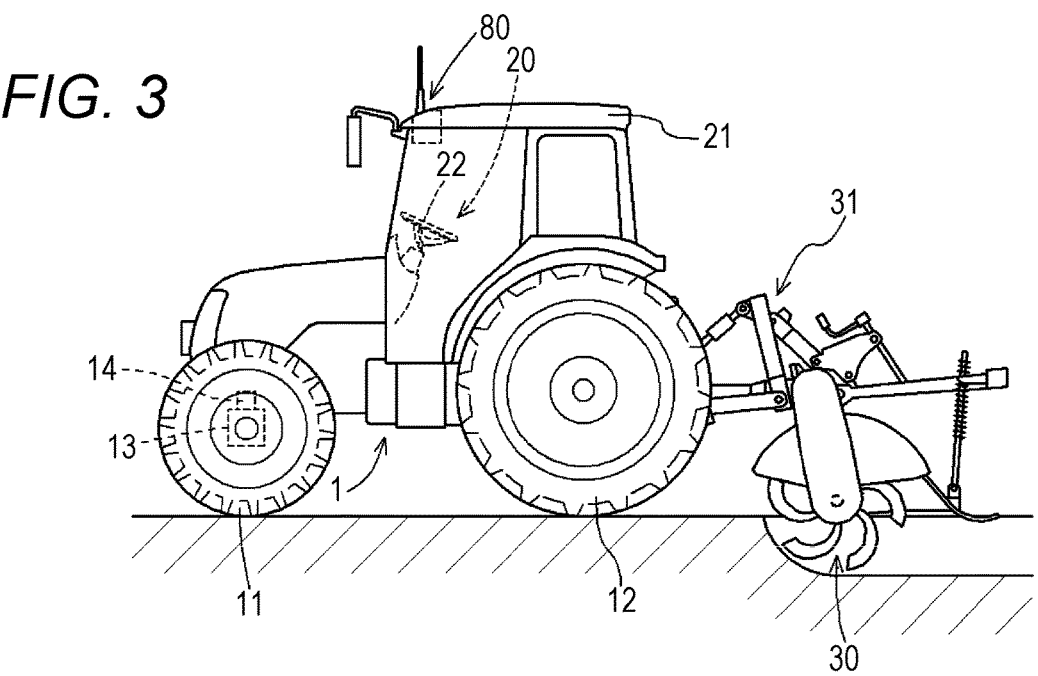
FIG. 3 is a side view of a tractor, an exemplary embodiment of the work vehicle.

Next, a work vehicle incorporated with the travel support system according to the specific exemplary embodiment of the present invention will now be described herein. In this exemplary embodiment, as shown in FIG. 3, the work vehicle is a tractor that travels and works in a field (work field) separated by ridges as boundaries. This tractor is provided with an operation unit 20 at a center of the vehicle body 1 supported by front wheels 11 and rear wheels 12. At a rear of the vehicle body 1, a work device 30 that is a rotary tilling machine is mounted via a hydraulic lifting mechanism 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual travelling, the front wheels 11 can be steered by operating a steering wheel 22 disposed on the operation unit 20. In a cabin 21 of the tractor, a satellite positioning module 80 configured as a GNSS module is provided. As a component of the satellite positioning module 80, a satellite antenna for receiving GPS signals and GNSS signals is attached at a ceiling area of the cabin 21. The satellite positioning module 80 may include an inertial navigation module incorporated with a gyro acceleration sensor and a magnetic director sensor for complementing satellite navigation. The inertial navigation module may also be provided in a different location from the satellite positioning module 80.

Figure 4:
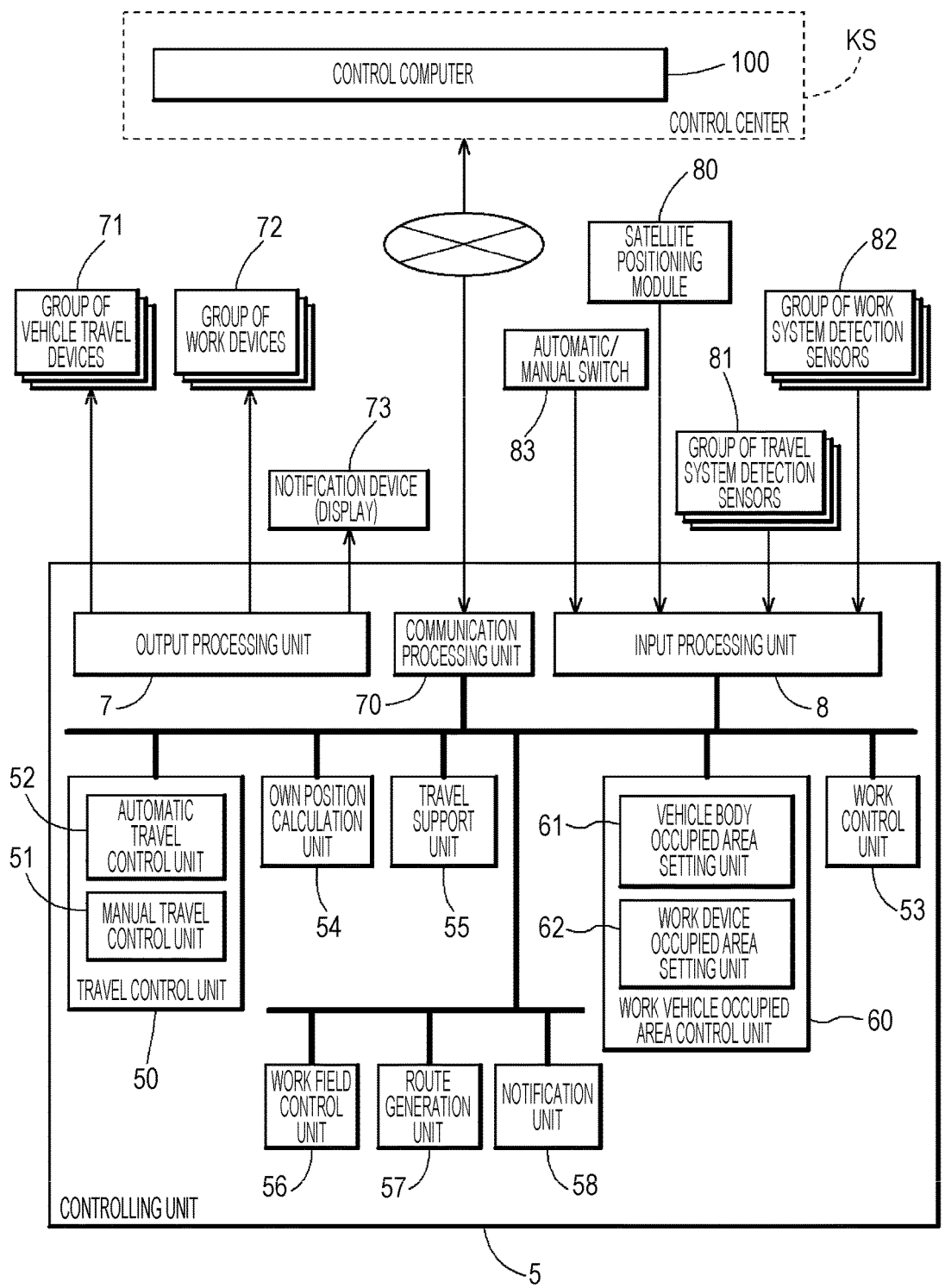
FIG. 4 is a functional block diagram illustrating a control system of the tractor.

FIG. 4 illustrates a control system configured in this tractor. This control system is configured to achieve the travel support system that uses obstruction information, an own position, and an area occupied by the work vehicle (vehicle body occupied area VA and work device occupied area WA) as described with reference to FIG. 1. A controlling unit 5 (circuitry 5) that is a core element of this control system includes an output processing unit 7 and an input processing unit 8, which respectively function as input and output interfaces, and a communication processing unit 70. The output processing unit 7 is connected with, for example, a group of vehicle travel devices 71, a group of work devices 72, and a notification device 73. The group of vehicle travel devices 71 includes the steering motor 14, and, although not shown in the drawings, devices to be controlled for allowing the work vehicle to travel, such as a transmission mechanism and an engine unit. The group of work devices 72 includes, for example, a drive mechanism for the work device 30, and a lifting mechanism 31 for raising and lowering the work device 30. The communication processing unit 70 has a function of sending data processed by the controlling unit 5 to a management computer 100 configured in a control center KS in a remote location, and receiving various kinds of data from the management computer 100. The notification device 73 includes a display, lamps, and a speaker. The lamps and the speaker are used to notify the driver and an operator of various kinds of desired information, including information on approaching to an obstruction that may hinder the work vehicle from travelling, and deviation information indicating a deviation from a target travel route when the work vehicle is automatically steered and travelled. Signals are transmitted between the notification device 73 and the output processing unit 7 in a wired or wireless manner.

The input processing unit 8 is coupled to, for example, the satellite positioning module 80, a group of travel system detection sensors 81, a group of work system detection sensors 82, and an automatic/manual switch 83. The group of travel system detection sensors 81 includes sensors for detecting travel states such as an engine speed and a transmission state. The group of work system detection sensors 82 includes, for example, sensors for detecting a ground clearance and an inclination of the work device 30, and sensors for detecting workloads and the like. The automatic/manual switch 83 is a switch for selecting either an automatic travel mode for travelling with automatic steering or a manual travel mode for travelling with manual steering. For example, operating the automatic/manual switch 83 while the work vehicle is travelling with the automatic travel (automatic steering) mode causes the work vehicle to switch to travelling with manual steering, and operating the automatic/manual switch 83 while the work vehicle is travelling with manual steering causes the work vehicle to switch to travelling with automatic steering.

The controlling unit 5 is configured to include a work vehicle occupied area control unit 60 (a third calculator 60) that manages an area occupied by the work vehicle by separating the area into a vehicle body occupied area VA and a work device occupied area WA as described with reference to FIG. 1. The controlling unit 5 also includes a travel control unit 50, a work control unit 53, an own position calculation unit 54 (a position calculator 54), a travel support unit 55 (a controller 55), a work field control unit 56, a route generation unit 57, and a notification unit 58.

The work field control unit 56 manages field information (work field information) that is information regarding the field in which the work vehicle works. The field information includes data such as a map position, shape, and size of a field, in addition to plant varieties, and further includes obstruction information that is information on obstructions that may hinder the work vehicle from travelling in the field. This obstruction information includes, for example, positions, shapes, and ground heights of the obstructions. The obstructions include not only facilities such as water wells and utility poles as well as stones and rocks present in the field, but also ridges and fences surrounded and served as boundaries of the field. The field information can be downloaded from the management computer 100 disposed in the control center KS in the remote location or a farmer's home, or a portable communication computer held by the driver.

Based on the field information, the route generation unit 57 reads external shape data of the field, and generates a travel route LN that fits to this field. This travel route LN may be generated automatically based on basic, initial parameters entered by an operator, or based on input parameters substantially defining a travel route LN entered by the operator. A configuration may be adopted, through which a travel route LN itself is downloaded from the management computer 100. In any case, the travel route LN obtained from the route generation unit 57 is developed in a memory, and used by the work vehicle to travel along the travel route LN regardless of whether the work vehicle is operated in either the automatic travel (automatic steering) mode or the manual travel (manual steering) mode.

The work vehicle occupied area control unit 60 includes a vehicle body occupied area setting unit 61 (a first calculator 61) that sets a vehicle body occupied area VA occupied by the vehicle body 1, and a work device occupied area setting unit 62 (a second calculator 62) that sets a work device occupied area WA occupied by the work device 30. In this exemplary embodiment, the vehicle body occupied area VA and the work device occupied area WA respectively change in size in accordance with a vehicle speed of the work vehicle. One of or both the vehicle body occupied area VA and the work device occupied area WA reduces or reduce when the work vehicle travels at a high speed, relative to occupied areas when the work vehicle travels at a low speed. The work device occupied area WA further reduces or disappears when a ground height of the work device exceeds a ground height of an obstruction. To this end, the work vehicle occupied area control unit 60 accepts vehicle speed data based on a vehicle speed detection sensor included in the group of travel system detection sensors 81, and work device height data based on a work device height detection sensor included in the group of work system detection sensors 82.

Figure 5:
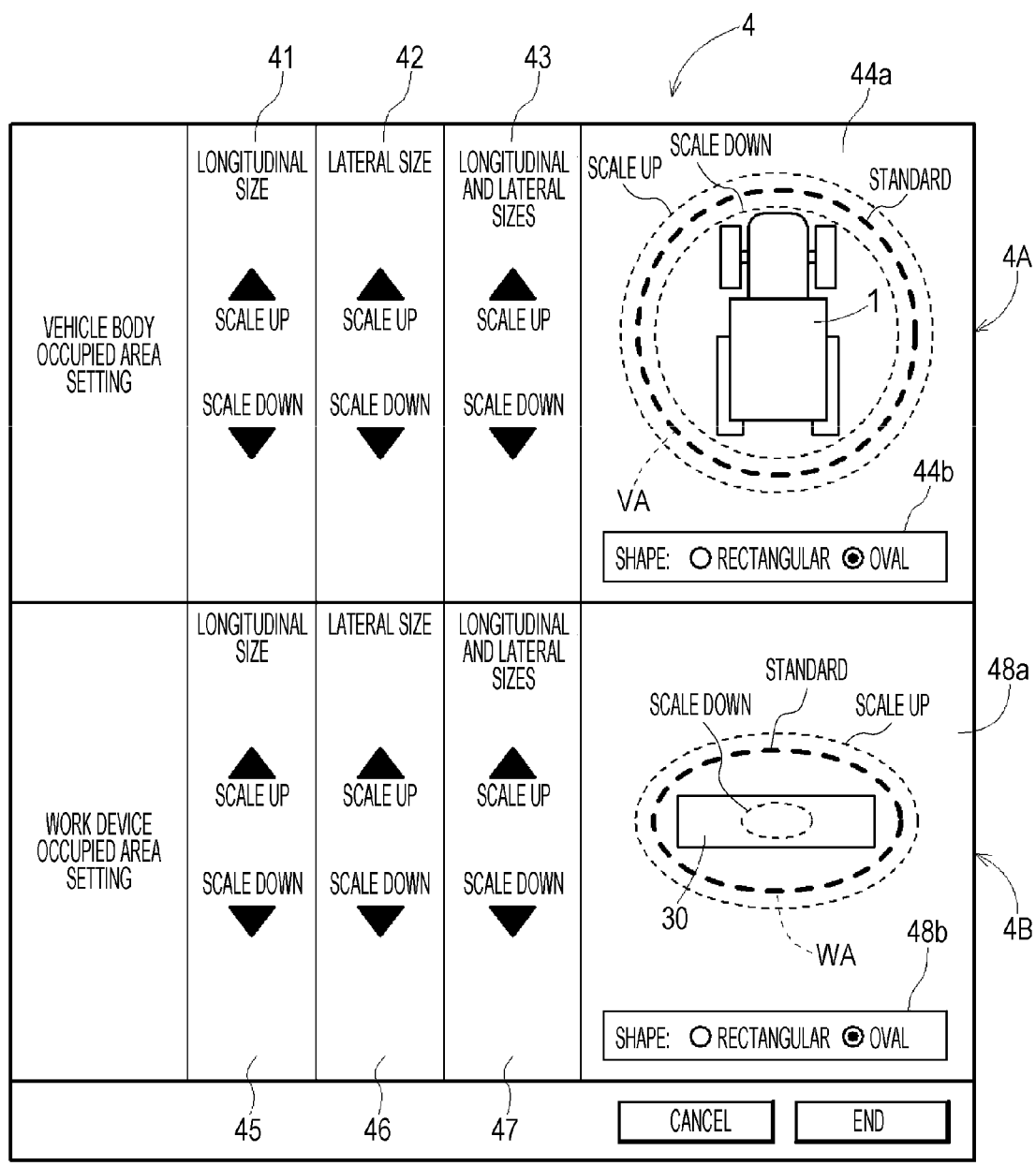
FIG. 5 is a view of an operation screen for adjusting sizes of the vehicle body occupied area and the work device occupied area.

In this exemplary embodiment, a size of a vehicle body occupied area VA and a size of a work device occupied area WA are separately adjustable and settable. This area adjustment setting can be performed through an area adjustment setting screen 4 shown on a display with a touch panel. As shown in FIG. 5, the area adjustment setting screen 4 is disposed with a vehicle body occupied area setting section 4A for setting a vehicle body occupied area VA, and a work device occupied area setting section 4B for setting a work device occupied area WA. The vehicle body occupied area setting section 4A is disposed with a longitudinal size adjustment unit 41 that adjusts a size of a vehicle body occupied area VA in a longitudinal direction, a lateral size adjustment unit 42 that adjusts the size of the vehicle body occupied area VA in a lateral direction, and a longitudinal and lateral size adjustment unit 43 that simultaneously adjusts the size of the vehicle body occupied area VA in the longitudinal direction and the size of the vehicle body occupied area VA in the lateral direction. A scale up button and a scale down button are disposed for adjusting a size of a vehicle body occupied area VA. An adjustment level display unit 44a for confirming an adjustment level of a vehicle body occupied area VA, and an area shape selection unit 44b for selecting a shape of the vehicle body occupied area VA are also disposed. In this exemplary embodiment, selectable shapes for a vehicle body occupied area VA are rectangular and oval (including circle). Similarly, the work device occupied area setting section 4B is disposed with a longitudinal size adjustment unit 45 that adjusts a size of a work device occupied area WA in a longitudinal direction, a lateral size adjustment unit 46 that adjusts the size of the work device occupied area WA in a lateral direction, and a longitudinal and lateral size adjustment unit 47 that simultaneously adjusts the size of the work device occupied area WA in the longitudinal and the size of the work device occupied area WA in the lateral direction. A scale up button and a scale down button are disposed for adjusting a size of a work device occupied area WA. An adjustment level display unit 48a for confirming an adjustment level of a work device occupied area WA and an area shape selection unit 48b for selecting a shape of the work device occupied area WA are also disposed. Selectable shapes for a work device occupied area WA include rectangular and oval (including circle).

Based on the positioning data sent from the satellite positioning module 80, the own position calculation unit 54 calculates an own position. The notification unit 58 generates a notification signal (display data or voice data) for notifying the driver and a supervisor of necessary information through the notification device 73 including the display and the speaker.

Since the automatic travel (automatic steering) mode and the manual travel (manual steering) mode are both configured to be available in this tractor for travelling, the travel control unit 50 for controlling the group of vehicle travel devices 71 includes a manual travel control unit 51 and an automatic travel control unit 52. In accordance with operations by the driver, the manual travel control unit 51 controls the group of vehicle travel devices 71. Based on steering shift data sent from the travel support unit 55, the automatic travel control unit 52 generates and outputs an automatic steering instruction to the steering motor 14 via the output processing unit 7. To control movement of the work device 30, the work control unit 53 provides control signals to the group of work devices 72.

The travel support unit 55 executes a control process that differs between the automatic travel (automatic steering) mode and the manual travel (manual steering) mode. In the automatic travel (automatic steering) mode, a function is achieved, through which an own position calculated by the own position calculation unit 54 and a travel route LN generated by the route generation unit 57 are compared and evaluated, and, if a positional difference arises between the own position and the travel route LN, steering shift data is generated and provided to the automatic travel control unit 52 so that the vehicle body 1 travels along the travel route LN. When the work vehicle is kept travelled, and a contour of the work vehicle, i.e., a virtual area occupied by the work vehicle and configured by a vehicle body occupied area VA and a work device occupied area WA, is determined to overlap with an obstruction area OB (possibility of interference), obstruction avoidance steering data is provided to prevent the work vehicle from coming into collision with an obstruction. Otherwise, the work vehicle may be stopped to urge a driver to steer and avoid the obstruction.

In the manual travel (manual steering) mode, the travel support unit 55 achieves a function through which an own position calculated by the own position calculation unit 54 and a travel route LN generated by the route generation unit 57 are compared and evaluated, and, if a positional difference arises between the own position and the travel route LN, data on the positional difference is provided to the notification unit 58. The positional difference is therefore notified to the driver through the notification device 73. When the work vehicle is kept travelled, and a possibility of interference between the work vehicle and an obstruction is determined to arise, data on the possibility of interference is provided to the notification unit 58 to urge the driver to steer and avoid the obstruction. The work vehicle may also be stopped in an emergency manner as required.

Other Exemplary Embodiments (1) When a tractor according to the above described exemplary embodiment is equipped with an obstruction detector, an obstruction area OB calculated based on data on an obstruction detected by the obstruction detector is provided to the travel support unit 55. The tractor can therefore be supported to travel to avoid interference with an obstruction that is not managed by the work field control unit 56, particularly moving obstructions. The obstruction area OB calculated based on data on an obstruction detected by the obstruction detector may otherwise be provided to the work field control unit 56.

(2) The above described exemplary embodiments have described the tractor equipped with the rotary tilling machine as the work device 30. However, in addition to such a tractor, various work vehicles may be adopted as exemplary embodiments, such as agricultural vehicles including, for example, rice transplanters and combines, and construction vehicles equipped with, for example, a dozer or a roller as the work device 30.

(3) Each function unit in the functional block diagram shown in FIG. 4 is separated for description purposes. In an actual case, each function unit can be integrated with other function units, or divided into a plurality of sub-function units.

INDUSTRIAL APPLICABILITY

The embodiments of the present invention are applicable to a work vehicle that travels and performs work on a ground, and a travel support system that supports the travelling of the work vehicle.

According to one aspect of the present invention, a travel support system for a work vehicle including a vehicle body and a work device provided on the vehicle body includes circuitry. The circuitry is configured to calculate a vehicle body occupied area including the vehicle body in a plan view. The circuitry is configured to calculate a work device occupied area including the work device in the plan view. The circuitry is configured to calculate a work vehicle occupied area including the work vehicle in the plan view, the work vehicle occupied area including the vehicle body occupied area and the work device occupied area. The circuitry is configured to calculate a position of the work vehicle in a work field based on positioning data. The circuitry is configured to control the work vehicle to move in the work field based on the position of the work vehicle and the work vehicle occupied area. Examples of the travelling of the work vehicle include travelling in a straight line and turning while performing work, and travelling in a straight line and turning without performing work.

According to this configuration, a virtual area occupied by a vehicle body and a work device in a work field is divided into two areas, i.e., a vehicle body occupied area and a work device occupied area, and is managed separately. Thus, any dead area where no work vehicle member presents is not included in an entire area occupied by a work vehicle even when a width of the work device is greater than a width of the vehicle body. For example, unless either a vehicle body occupied area or a work device occupied area interferes with an obstruction even if both of the occupied areas approach the obstruction, an area that remains unworked even when a work vehicle is supported and travelled to approach the obstruction can be reduced effectively.

A main reason for setting a vehicle body occupied area and a work device occupied area is to replace an area required to prevent an own vehicle from coming into collision with an obstruction with a virtual shape which is simpler than a shape of an actual work vehicle, and to calculate a possibility of the interference as simple as possible. The circuitry therefore may advantageously be configured to determine a possibility of interference between an obstruction present in the work field and each of the vehicle body and the work device. Obstructions present and stand still themselves in a work field include externally surrounding obstructions such as fences and ridges served as boundaries of the work field, and internally existing obstructions such as water wells, utility poles, stones, and rocks present in the work field. When a work vehicle has an obstruction detection function, moving obstructions such as persons, animals, and other work vehicles are also handled as obstructions in the embodiments of the present invention.

It is therefore advantageous that positions and sizes of obstructions such as ridges and fences served as boundaries of a work field, as well as utility poles, water wells, stones, and rocks present in the work field are managed beforehand. It is further advantageous that, when a work vehicle itself has an obstruction detection function, a position and a size of an obstruction detected during travelling is managed at that time. To this end, according to an advantageous exemplary embodiment of the present invention, the circuitry is configured to manage obstruction information including a position and a size of an obstruction in the work field. In this case, the travel support unit can also support the travelling of the work vehicle, with the obstruction information taken into account.

Various travel states arise in a work vehicle. Factors determining a travel state include, for example, change in orientation of a work device, travelling at a high or low speed, travelling in a straight line, making a turn, high and low load operations, and travelling on a rough ground or a muddy ground. Steering stability and braking performance of a work vehicle change depending on a travel state. Even in a travel state where steering stability and braking performance of a work vehicle deteriorate, expanding an area occupied by the work vehicle can enhance safety. This means that a function of changing a size of the work vehicle occupied area in accordance with a travel state of the work vehicle may be advantageous.

A vehicle speed of a work vehicle in particular significantly affects not only steering stability and braking performance of the work vehicle, but also precision in calculation of an own position. This means that adopting a configuration where a size of the work vehicle occupied area is changed in accordance with a vehicle speed of the work vehicle may be advantageous.

A work device having a greater ground height is less likely to come into collision with obstructions such as low stones and rocks, low water wells, low ridges, and low fences present in a work field. When an interference relationship between heights of such a work device and an obstruction is known beforehand, obstructions which are not necessary to take into account interference with the work device while travelling can be determined. According to another advantageous exemplary embodiment of the present invention, when a ground height of an obstruction in the work field is lower than a ground height of the work device, the work vehicle occupied area reduces or disappears at least while the work vehicle travels around the obstruction. This feature can reduce consideration of interference between the work device and an obstruction more than necessary, thus prevent as much as possible travel efficiency from being lowered.

A work vehicle is sometimes equipped with on its vehicle body a work device via a lifting mechanism. In such a work device, a possibility of interference with an obstruction changes depending on a position of a ground height. In response to this, according to still another advantageous exemplary embodiment of the present invention, when the vehicle body is equipped with the work device via a lifting mechanism to control a ground height of the work device, the work vehicle occupied area changes in accordance with the ground height changed by the lifting mechanism. This feature can reduce consideration of interference between the work device and an obstruction more than necessary, thus prevent as much as possible travel efficiency from being lowered.

A vehicle body occupied area and a work device occupied area are used by the travel support unit to mainly avoid interference with an obstruction while travelling. A degree of damage when the work vehicle comes into collision with an obstruction also differs depending on a type of a work device. When the work vehicle travels in a field where a degree of damage becomes significant if the work vehicle comes into collision with an obstruction, a risk of interference with the obstruction is reduced by advantageously expanding an area occupied by the work vehicle. This means that importance of a vehicle body occupied area and a work device occupied area, i.e., sizes of the occupied areas, differ depending on a work field or a travelling operation. According to still another advantageous exemplary embodiment of the present invention, therefore, a size of the vehicle body occupied area and a size of the work device occupied area are separately settable. An appropriate travel operation can therefore be selected by taking into account both safety and travel efficiency.

The embodiments of the present invention also provide a work vehicle incorporated with the above described travel support system. Such a work vehicle includes a vehicle body, a work device provided on the vehicle body, and circuitry. The circuitry is configured to calculate a vehicle body occupied area including the vehicle body in a plan view. The circuitry is configured to calculate a work device occupied area including the work device in the plan view. The circuitry is configured to calculate a work vehicle occupied area including the work vehicle in the plan view, the work vehicle occupied area including the vehicle body occupied area and the work device occupied area. The circuitry is configured to calculate a position of the work vehicle in a work field based on positioning data. The circuitry is configured to control the work vehicle to move in the work field based on the position of the work vehicle and the work vehicle occupied area. The work vehicle can achieve functional effects identical to the functional effects of the above described travel support system, and include the above described various advantageous exemplary embodiments.

The circuitry configured to determine a possibility of interference between an obstruction present in the work field and each of the vehicle body and the work device can particularly prevent the work vehicle from coming into collision with an obstruction while travelling based on the determined possibility of interference.

Such a work vehicle may therefore advantageously include the circuitry to manage obstruction information including positions and sizes of obstructions such as ridges and fences served as boundaries of a work field, and utility poles, water wells, stones, and rocks present in the work field, in addition to other obstruction information including positions and sizes of obstructions detected while travelling.

A work vehicle can be steered and travelled either manually or automatically in a work field along a guidance travel route. When a work vehicle that is steered and travelled manually is equipped with a notification unit that notifies a possibility of interference, a driver is able to know the notified possibility of interference, and to avoid an obstruction. Since a work vehicle that is steered and travelled automatically is equipped with an automatic travel control unit that automatically steers the work vehicle so as to travel along a guidance travel route, this automatic travel control unit can be configured to automatically steer the work vehicle so as to avoid the obstruction, based on the possibility of interference.

Obviously, numerous modifications and variations of the present invention are possible in light of the above teachings. It is therefore to be understood that within the scope of the appended claims, the invention may be practiced otherwise than as specifically described herein.

What is claimed is:

1. A travel support system for a work vehicle including a vehicle body and a work device provided on the vehicle body, comprising:
   a first calculator to calculate a vehicle body occupied area including the vehicle body in a plan view;
   a second calculator to calculate a work device occupied area including the work device in the plan view;
   a third calculator to calculate a work vehicle occupied area including the work vehicle in the plan view, the work vehicle occupied area including the vehicle body occupied area and the work device occupied area;
   a position calculator to calculate a position of the work vehicle in a work field based on positioning data; and
   a controller to control the work vehicle to move in the work field based on the position of the work vehicle and the work vehicle occupied area.

2. The travel support system according to claim 1, wherein the controller is configured to manage obstruction information including a position and a size of an obstruction in the work field.

3. The travel support system according to claim 1, wherein a size of the work vehicle occupied area changes in accordance with a travel state of the work vehicle.

4. The travel support system according to claim 3, wherein a size of the work vehicle occupied area changes in accordance with a vehicle speed of the work vehicle.

5. The travel support system according to claim 1, wherein the work vehicle occupied area reduces or disappears at least while the work vehicle travels around the obstruction, when a ground height of an obstruction in the work field is lower than a ground height of the work device.

6. The travel support system according to claim 1, wherein the work vehicle occupied area changes in accordance with the ground height changed by the lifting mechanism when the vehicle body is equipped with the work device via a lifting mechanism to control a ground height of the work device.

7. The travel support system according to claim 1, wherein a size of the vehicle body occupied area and a size of the work device occupied area are separately settable.

8. The travel support system according to claim 1, wherein the controller is configured to determine a possibility of interference between an obstruction in the work field and each of the vehicle body and the work device.

9. A work vehicle comprising:
   a vehicle body;
   a work device provided on the vehicle body;
   a first calculator to calculate a vehicle body occupied area including the vehicle body in a plan view;
   a second calculator to calculate a work device occupied area including the work device in the plan view;
   a third calculator to calculate a work vehicle occupied area including the work vehicle in the plan view, the work vehicle occupied area including the vehicle body occupied area and the work device occupied area;
   a position calculator to calculate a position of the work vehicle in a work field based on positioning data; and a controller to control the work vehicle to move in the work field based on the position of the work vehicle and the work vehicle occupied area.

10. A travel support method for a work vehicle, comprising:
calculating a vehicle body occupied area including a vehicle body of the work vehicle in a plan view;
calculating a work device occupied area including a work device of the work vehicle in the plan view;
calculating a work vehicle occupied area including the work vehicle in the plan view, the work vehicle occupied area including the vehicle body occupied area and the work device occupied area;
calculating a position of the work vehicle in a work field based on positioning data; and
controlling the work vehicle to move in the work field based on the position of the work vehicle and the work vehicle occupied area.

\* \* \* \* \*